US012796610B2

(12) United States Patent
Clark et al.

(10) Patent No.: US 12,796,610 B2
(45) Date of Patent: Nov. 17, 2026

(54) FOLDABLE HARVESTING MACHINE IMPLEMENT

(71) Applicant: DEERE & COMPANY, Moline, IL (US)

(72) Inventors: Scott N. Clark, Bettendorf, IA (US); Pritam A. Khot, Pune (IN)

(73) Assignee: DEERE & COMPANY, Moline, IL (US)

( * ) Notice: Subject to any disclaimer, the term of this patent is extended or adjusted under 35 U.S.C. 154(b) by 268 days.

(21) Appl. No.: 18/732,699

(22) Filed: Jun. 4, 2024

(65) Prior Publication Data

US 2025/0366393 A1 Dec. 4, 2025

(51) Int. Cl.
*A01D 41/14* (2006.01)

(52) U.S. Cl.
CPC .................................. *A01D 41/144* (2013.01)

(58) Field of Classification Search
CPC .................................................... A01D 41/144
See application file for complete search history.

(56) References Cited

U.S. PATENT DOCUMENTS

| | | | | |
|---|---|---|---|---|
| 681,277 | A | 8/1901 | Switzer | |
| 802,892 | A | 10/1905 | Sharp | |
| 1,085,299 | A | 1/1914 | Wesley | |
| 1,883,770 | A | 10/1932 | Dowling | |
| 2,352,257 | A | 6/1944 | Dray | |
| 2,701,945 | A | 2/1955 | Richardson | |
| 4,825,628 | A | 5/1989 | Brooks | |
| 5,673,543 | A * | 10/1997 | Richardson .......... | A01D 41/144 56/85 |
| 6,442,918 | B1 | 9/2002 | Fox | |
| 7,162,855 | B2 * | 1/2007 | Boeckmann ......... | A01D 45/021 56/15.2 |
| 9,918,430 | B2 * | 3/2018 | Roberge ............... | A01D 41/144 |
| 10,653,064 | B2 | 5/2020 | Bollin et al. | |
| 10,820,509 | B2 * | 11/2020 | Schroeder ............ | A01D 61/004 |
| 11,580,950 | B2 * | 2/2023 | Wells .................. | G10L 21/0364 |
| 2018/0177121 | A1 | 6/2018 | Lauwers et al. | |
| 2019/0124842 | A1 | 5/2019 | Ricketts et al. | |
| 2020/0146217 | A1 | 5/2020 | Trowbridge | |

OTHER PUBLICATIONS

Treadle Linkage, pp. 1-5, [online]. Retrieved from the Internet <URL: https://technologystudent.com/despro_flsh/treadle1.html>.

* cited by examiner

*Primary Examiner* — Nicole Coy

(57) ABSTRACT

Provided in an implement for a harvesting machine. The implement may include a plurality of crop engaging members that may extend from one or more crop engaging member supports. The crop engaging member support(s) may extend from an extension member. At least a portion of the crop engaging member support(s) may be movable with respect to the extension member between harvest and non-harvest positions. In some implementations, the implement may include at least two extension members. Each extension member may be joined to one or more crop engaging member supports, from which crop engaging members may extend. One or more of the extension members may be movable between harvest and nonharvest positions.

11 Claims, 12 Drawing Sheets

FOLDABLE HARVESTING MACHINE IMPLEMENT

TECHNICAL FIELD

The present disclosure relates generally to combine harvesters for crop harvesting. More particularly it relates to a combine harvester having a folding implement with a plurality of crop engaging members that move between extended and retracted positions to gather crop.

BACKGROUND

Agricultural harvesters may serve to harvest many types of crops, including but not limited to, grain crops, hay and forage crops, cotton crops, and/or sugar crops. Combines, or sometimes combine harvesters, often harvest grain crop(s). Combines are so named because they combine several tasks necessary to process a crop, such as a grain crop, at harvest. For example, a combine may cut, gather, thresh, and clean the crop. A combine may include several subsystems, including, but not limited to, a header or implement, a threshing section, a separating section, a cleaning shoe, a tailings section, a clean grain tank, a power unit, and a residue handling section. Each of these subsystems may in turn include several components. The header may include a gathering section to move crops toward the body of the combine. The header may also include a cutting section to cut the crop.

SUMMARY

Provided are embodiments of an implement for a harvesting machine. A first embodiment of an implement includes a first group of crop engaging members extending from a first crop engaging member support. The first crop engaging member support extends from a first extension member. At least a portion of the first crop engaging member support may be movable with respect to the first extension member between a harvest position and a nonharvest position. Such an implement may also include a second group of crop engaging members extending from a second crop engaging member support. The second crop engaging member support may extend from a second extension member. At least a portion of the second crop engaging member support may be movable with respect to the second extension member between a harvest position and a nonharvest position.

In some embodiments, a plurality of crop engaging member supports may extend from the first and/or second extension members, and at least a portion of the crop engaging member supports may be movable with respect to the extension member from which it extends. Such movement may be between harvest and nonharvest positions. In some embodiments, the first and second crop engaging member supports may be pivotable. Some embodiments may include more than two groups of crop engaging members, such as third and fourth groups of crop engaging members. The third and fourth groups of crop engaging members may extend from third and fourth crop engaging member supports, respectively. The third and fourth crop engaging member supports may extend from third and fourth extension members, respectively. At least a portion of the third and fourth crop engaging member supports may be movable with respect to the third and fourth extension members, respectively. In some embodiments, one or more of the first, second, third, and fourth extension members may be movable between harvest and nonharvest positions.

An implement of the present invention may include a source of motion configured to drive the first and second extension members between extended and retracted positions. Further, the implement may include first and second motion transferring members joined to the first and second extension members, respectively. The first extension member may be configured to move the first group of crop engaging members between a first group extended position and a first group retracted position, and the second extension member may be configured to move at least a portion of the second group of crop engaging members between a second group extended position and a second group retracted position. In some embodiments, the first and second groups of crop engaging members revolve about each other as they move between extended and retracted positions.

In another embodiment of the present invention, an implement for a harvesting machine is provided including first and second groups of crop engaging members extending from first and second crop engaging member supports, respectively. The first and second crop engaging member supports may be connected to first and second extension members, respectively. The second extension member may be movable between harvest and nonharvest positions. In some embodiments, the implement may include a first bracket that is rotatable between harvest and nonharvest positions. Moreover, movement of the first bracket between harvest and nonharvest positions may move the second extension member between harvest and nonharvest positions. In some embodiments, the implement may include a plurality of crop engaging members extending from the first extension member, a plurality of crop engaging member supports extending from the second extension member, and a plurality of crop engaging members extending from each crop engaging member support. In some embodiments, at least a portion of each crop engaging member support may be movable between harvest and nonharvest positions.

BRIEF DESCRIPTION OF THE DRAWINGS

The detailed description of the drawings refers to the accompanying figures.

Like reference numerals are used to indicate like elements throughout the several figures.

DETAILED DESCRIPTION

The following is a detailed description of one or more embodiments of technology, including systems, methods, and apparatuses, for a harvesting machine implement.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Moreover, sometimes terms such as "above," "below," "upward," "downward," "top," "bottom," etc., will also be used in connection with describing the combine harvester as it is oriented when it sits on the ground in its customary operating mode. However, these terms are again used for description purposes and do not represent limitations on the scope of the disclosure, unless required by the claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
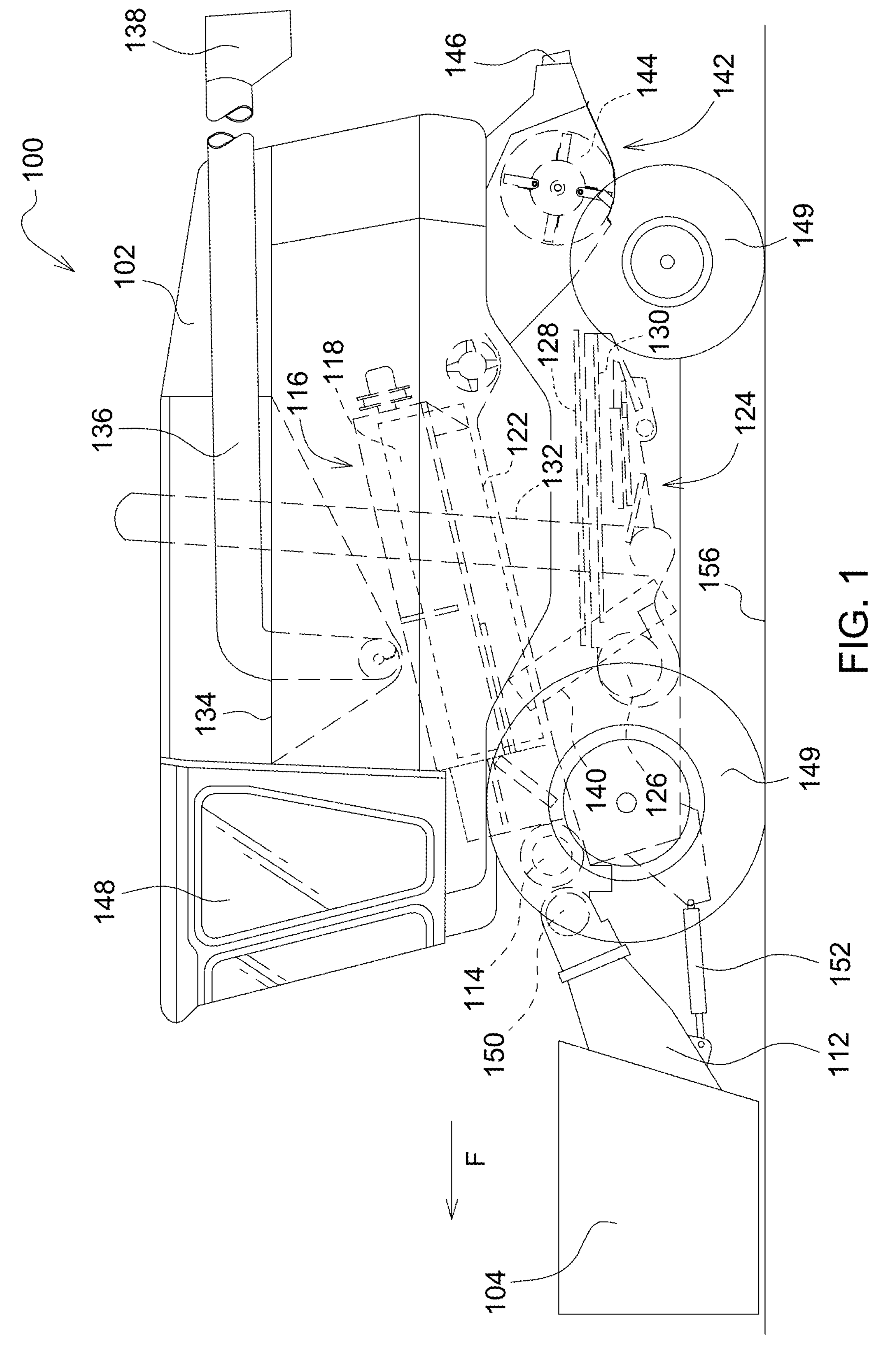
FIG. 1 is an elevation view showing the side of an embodiment of a combine harvester.

Referring to FIG. 1, an exemplary agricultural harvester 100 (sometimes "harvester") is shown. The illustrated harvester 100 serves to process crop products, including but not limited to grains, from a field. In some embodiments, the agricultural harvester 100 is configured to move in a forward direction of travel F through a crop field to harvest plants, for example crops planted in rows. The harvester embodiment shown in FIG. 1 is a combine harvester. As noted above, combine harvesters are so named because they combine two or more tasks associated with harvesting a crop. The illustrated harvester shows components associated with at least the following tasks: gathering crop, severing crop, threshing, separating crop products (e.g., grain) from crop residue (e.g., material other than grain), cleaning crop products, processing tailings, and processing crop residue. However, agricultural harvesters having fewer, more, and/or different functions may be included in the scope of this invention.

Referring to the gathering and severing functions, harvester 100 may include an implement 104 (sometimes called a head or header). Implement 104 may include a gathering section and/or a cutting section to gather and cut crop, respectively. In some embodiments, the cutting section may include one or more knives or blades. The cut portions of the crop may be moved towards a feeder house 112, which may be located behind the implement, often near the center. Movement towards the feeder house 112 may be via one or more conveyer belts, augers, or other means. The cut portions of the crop may be moved from the feeder house 112 to a feed accelerator 114 and into the body 102 of the combine.

The cut portion of the crop may include grain and material other than grain. When the cut portion of the crop enters the body 102, the grain may be attached to a portion of the material other than grain. In the body of the combine, the cut portions of the crop are first introduced to a threshing section or thresher 116. The threshing section 116 detaches the grain from the portion of the plant to which it is attached (e.g., the threshing section may separate one or more corn kernels from a cob or one or more soybeans from a pod). Once the grain is detached, the material other than grain may be referred to as residue or crop residue. The threshing section 116 typically includes a rotor 118 with a plurality of threshing projections extending therefrom. The threshed material may move to a separating section 122 to separate grain from large pieces of material other than grain.

After the separating section 122, grain typically moves through a cleaning section, sometimes referred to as a cleaning shoe, 124. The cleaning section 124 may include a cleaning fan 126, chaffer 128, and a sieve 130 which work in combination to separate grain from comparatively similar sized pieces of crop residue that were not separated from the grain in the separating section 122. After the cleaning section 124, grain may either be clean, in which case it follows the path of clean grain, or it may require further processing. If grain is clean, it moves to a clean grain elevator 132, which may be any type, including but not limited to an auger or a conveyer. The clean grain elevator 132 moves clean grain to a clean grain tank 134. The clean grain may be moved from the clean grain tank 134 via an unloading auger 136 and spout 138. On the other hand, the grain may require further processing, such as in the case of incompletely threshed grain. Such grain requiring further processing after the cleaning section 124 is commonly referred to as tailings. The tailings may move to the tailings elevator 140, which may be any type, including but not limited to an auger or a conveyer. The tailings elevator 140 may move the tailings back to the threshing section 116 to be further processed. Alternatively, in some harvesters 100 a separate tailings section (not shown) may further thresh and process the tailings. Crop residue may move through a residue handling section 142, which may include a chopper 144 and spreader 146. The residue handling section 142 ultimately discharges crop residue out of the harvester 100 back onto the field via the spreader 146.

The harvester 100 components associated with gathering and severing crops are sometimes housed on implement 104. The remaining functions of the harvester 100 are typically housed in the body 102 of the harvester. The body 102 of the harvester may also include an operator station 148, engine (not shown), and ground engaging mechanism(s), such as one or more wheels 149 or one or more track assemblies (not shown). In some embodiments, the implement 104 may be selectively removable from the body 102 of the harvester. The implement 104 may be pivotable with respect to the body 102, such as via pivot 150. The pivoting movement may be aided by at least one implement support 152, which in the illustrated embodiment is a hydraulic support but may be any type. To that end, implements, sometimes called headers or heads, may be interchangeable. Therefore, the same harvester 100 may be used to harvest a plurality of crops and crop products.

Figure 2:
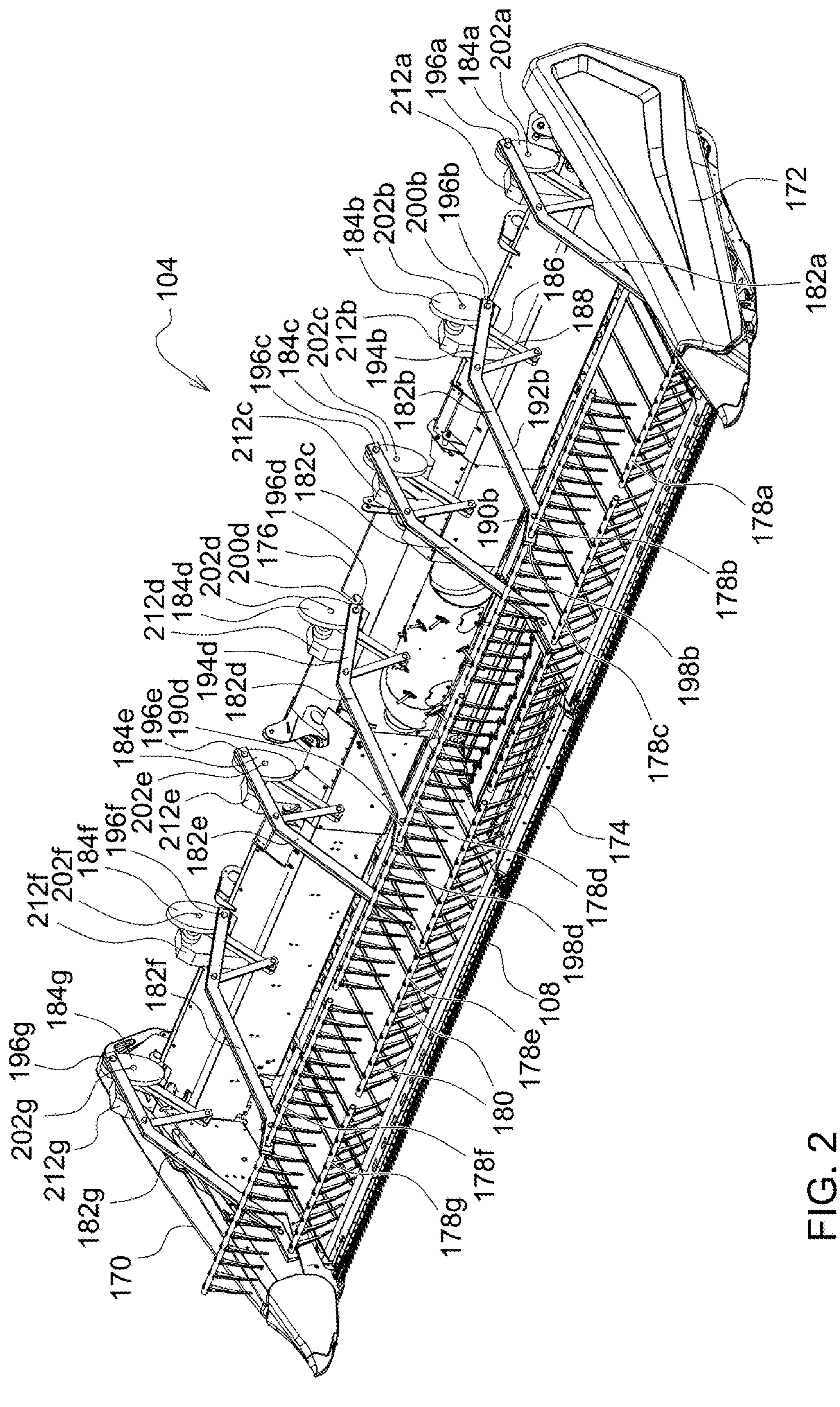
FIG. 2 is a perspective view of a first embodiment of a header of the present invention.

Turning to FIG. 2, an embodiment of an implement 104 of the present invention is shown. The implement 104 includes a first end 170, second end 172, front 174, and rear 176. The implement front 174 is located in the direction of forward travel shown in FIG. 1 relative to the rear 176. The rear 176 is located in the direction of the harvester body 102 relative to the front 174. In the embodiment of FIG. 2, the implement 104 includes at least one crop engaging member 180. In the illustrated embodiment, a plurality of crop engaging members 180 are joined to at least one crop engaging member support 178. The illustrated embodiment includes a plurality of crop engaging member supports 178. In the illustrated embodiment, the crop engaging members 180 are in the form of a tine. However, any type or shape of crop engaging member may be used without departing from the scope of the invention. As will be discussed in greater detail below, the crop engaging member supports 178 are movable between extended and retracted positions. This in turn moves the crop engaging members 180 between extended and retracted positions. The movement between the extended and retracted positions results in the crop engaging members gathering crops that are subject to harvest by the implement 104.

Returning to FIG. 2, in at least one embodiment, the crop engaging member support(s) 178 may be joined to and/or supported by at least one extension member 182. In the embodiment shown in FIG. 2, the extension member 182 includes at least one bar or rod. Furthermore, in some embodiments, the extension member 182 includes a first portion 190, second portion 192, and a third portion 194. The first portion 190 is at an angle to the second portion 192, and the second portion is at an angle to the third portion 194. This embodiment has the effect of positioning the crop engaging member support 178 and the crop engaging members 180 at an appropriate location for engaging and gathering crops. In addition, the illustrated embodiment can allow for reduced height of the implement 104, which may improve visibility and/or line of sight during operation. The lower profile may also allow the implement 104 to be more easily towed behind combine 100 or another towing vehicle. Further, the illustrated embodiment may provide ease of folding to reduce the overall width of the implement, such as for transport. The extension member 182 includes a first end 198 and a second end 200. In the embodiment of FIG. 2, the extension member is joined to the crop engaging member support 178 at or near its first end 198 and to a cam 184 at a cam engagement location 196 at or near its second end 200. The cam 184 will be discussed in further detail below. While the illustrated embodiment is described in detail, any type, shape, or configuration of extension member 182 may be used without departing from the scope of the invention.

As noted above, the extension member(s) 182 may be in operational engagement with at least one source of motion. In the illustrated embodiment, the extension member 182 is joined to a motion transferring member, which is in turn joined to a source of motion. However, any configuration may be used without departing from the scope of the invention. In the embodiment shown in FIG. 2, each extension member 182 is in engagement with a cam 184 at a cam engagement location 196. Also shown are first and second extension member supports 186, 188 which further connect an extension member 182 to the cam 184. First and second extension member supports 186, 188 may provide structural support to the extension members. In some embodiments, one or more extension members 182 may be movable in a vertical or partially vertical direction via actuation. Such actuation may be via any method, including but not limited to a hydraulic cylinder or an electric actuator. First and second extension member supports 186, 188 may include components and/or structure necessary for such vertical or partially vertical movement and/or actuation. Moreover, in some embodiments, the extension members 182 may be adjusted in the fore or aft direction, such that the position(s) of the crop engaging member support 178 and/or crop engaging members 180 may be adjusted in the fore or aft direction. In other words, the position(s) of the crop engaging member support 178 and/or crop engaging members 180 may be adjusted with respect to the implement front 174, implement rear 176, and/or cutter 108. The cam(s) 184 are driven to rotate by one or more sources of motion. In some embodiments, the source of motion may be a motor. Such a motor may be any type. In some embodiments, such a motor is a hydraulic motor. Other types of motors may include, but are not limited to, an electric motor or an internal combustion engine. As shown in FIG. 2, in some embodiments of an implement 104, a plurality of cams 184 are each in engagement with a single extension member 182. In some embodiments, each cam 184 is in engagement with a single motor 212 that serves to drive the motion of a single cam 184. As such each cam 184 has its own motor 212. In such embodiments, operation of the motors may be synchronized and/or complimentary to result in the motion described herein below. Moreover, any type and/or number of sources of motion may be used without departing from the scope of the invention. For example, in some embodiments more than one extension member 182 may be in engagement with the same source of motion, as will be described in further detail below.

In some embodiments, the source of motion drives movement of a motion transferring member. The illustrated embodiment includes at least one cam 184 to transfer motion from a motor 212 to the extension member 182. In the embodiment shown in FIG. 2, the motors 212 cause the cam 184 to rotate. As the cam 184 rotates, the cam engagement location 196 moves about the center 202 of the cam 184. As the cam engagement location 196 moves about the center of the cam 184, the extension member second end 200 in turn moves about the center of the cam 184. Movement of the extension member second end 200 causes the extension member 182 to move in a corresponding manner. Consequently, the extension member 182 may move between extended and retracted positions relative to the implement rear 176. While the illustrated embodiment includes a cam 184, any motion transferring member may be used. Other examples include, but are not limited to, a wheel or pulley driving one or more extension members 182, a rack and pinion such as to control linear motion, one or more gears, one or more sprockets, and/or one or more linkages. In some embodiments, the motion transferring member converts motion from a source of motion to reciprocation or translated horizontal movement. In one or more embodiments, vertical movement of the extension members 182 may be accomplished by a separate actuator and/or cylinder.

Movement of the extension member 182 between extended and retracted positions causes the crop engaging member support 178 and crop engaging members 180 to also move between extended and retracted positions relative to the implement rear 176. When the extension member 182 and crop engaging members 180 are in an extended position, the crop engaging members 180 are at a further distance from the implement rear 176. When the extension member 184 and crop engaging members 180 are in a retracted position, the crop engaging members 180 are at a closer distance to the implement rear 176. Said another way, when moving from the retracted position to the extended position, the crop engaging members 180 move generally in the direction of forward travel F (referring to FIG. 1). When moving from the extended position to the retracted position, the crop engaging members 180 move generally opposite the direction of forward travel F. Movement of the crop engaging members 180 between extended and retracted positions gathers crop and moves it toward the rear 176 of the implement. In some embodiments, the extension member 182, and accordingly the crop engaging member support 178 and crop engaging members 180, may have a plurality of extended and/or retracted positions and a user and/or control system may choose between the plurality of positions during a particular harvesting operation. Such a plurality of extended and/or retracted positions could also be considered partially extended and/or partially retracted positions when compared to the most extended position and most retracted position possible. All are within the scope of the invention.

Figure 3:
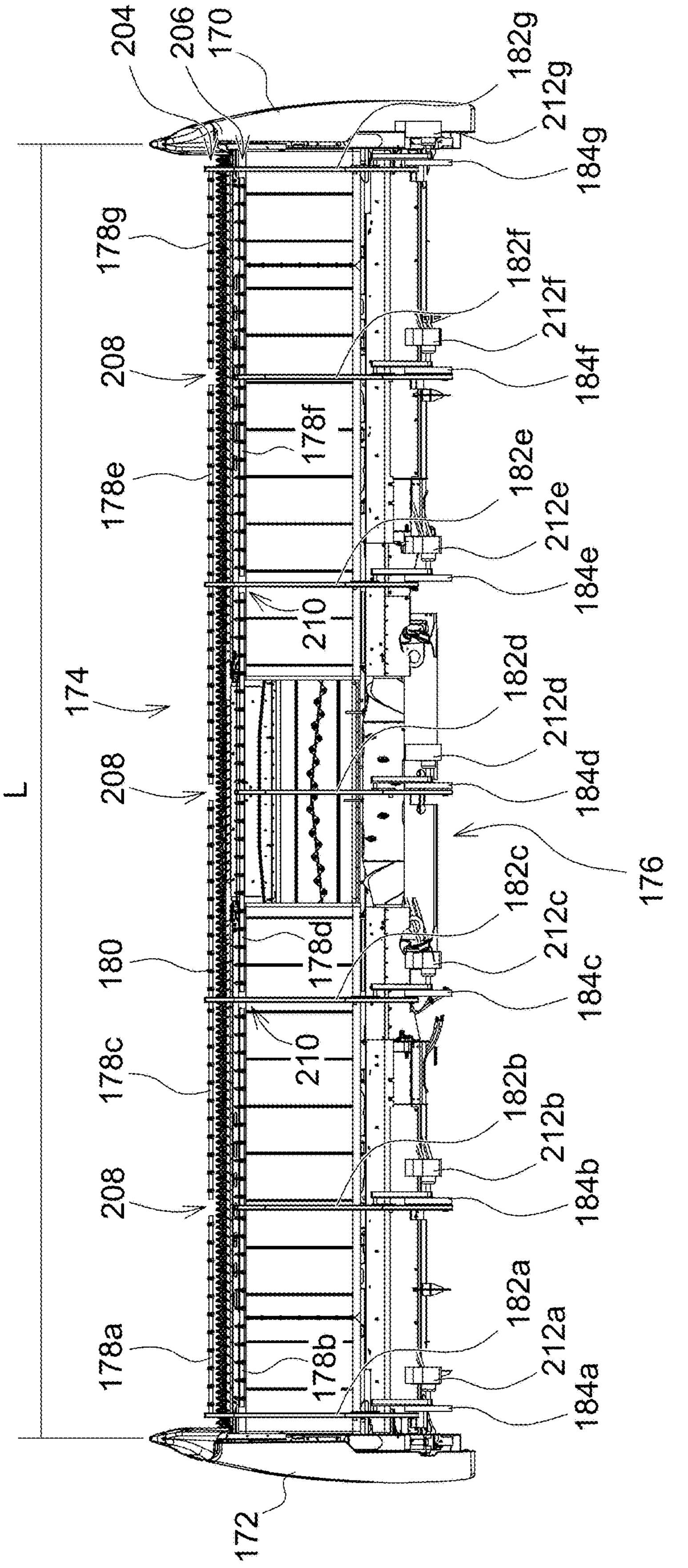
FIG. 3 is a top plan view of the embodiment of a header of the present invention of FIG. 2.

In some embodiments, a plurality of crop engaging member supports 178 may be aligned in a row across all or a portion of the length L of the implement 104. Turning to FIG. 3, for example, crop engaging member supports 178*a*, 178*c*, 178*e*, and 178*g* are aligned in a linear or substantially linear first row 204 extending across a substantial portion of the length L of the implement 104. In addition, crop engaging member supports 178*b*, 178*d*, 178*f* are aligned in a linear or substantially linear second row 206 extending across a substantial portion of the length L of the implement 104. Crop engaging member supports 178 may be joined to extension members 182 by any manner customary in the art. Examples include, but are not limited to, positioning isolators, fasteners, welding, and adhering the crop engaging member supports 178 to the extension members 182. In some embodiments the crop engaging member supports 178 may be joined to the extension members 182 such that the crop engaging member support 178 is adjustable such that the angle of the crop engaging members with respect to the ground may be changed, such as by an operator and/or a control system.

Returning again to FIG. 3, the illustrated embodiment shows a first row 204 of crop engaging member supports 178*a*, 178*c*, 178*e*, 178*g* and a second row 206 of crop engaging member supports 178*b*, 178*d*, 178*f*. The illustrated embodiment shows a plurality of extension members 182*a*, 182*c*, 182*e*, 182*g* associated with the first row 204. It further shows a plurality of extension members 182*b*, 182*d*, 182*f* associated with the second row 206. The first row 204 and second row 206, and components associated therewith, are configured to move between extended and retracted positions in a complimentary manner. For example, as the first row 204 moves to an extended position, the second row 206 moves to a retracted position. Moreover, the first row 204 includes at least one first row gap 208, and the second row 206 includes at least one second row gap 210. The first row gaps 208 are configured to allow extension members 182*b*, 182*d*, 182*f* to pass therethrough during complimentary motion. The second row gaps 210 are configured to allow extension members 182*c*, 182*e* to pass therethrough during complimentary motion. Moreover, the overall length of rows 204 and 206 may be configured to allow outer extension members 182*a*, 182*g* to pass beside the rows. In some embodiments, such as that shown in FIG. 9, one or more extension members 182 may be associated with all or multiple rows. For example, a single extension member 182 may be joined to two or more crop engaging member supports 178 that are associated with two or more rows.

Accordingly, referring to FIGS. 2 and 3, during operation of the illustrated embodiment, each of the cams 184*a*, 184*b*, 184*c*, 184*d*, 184*e*, 184*f*, 184*g* is driven to rotate, such as by a plurality of hydraulic motors 212*a*, 212*b*, 212*c*, 212*d*, 212*e*, 212*f*, 212*g*. As each cam rotates, each corresponding extension member 182*a*, 182*b*, 182*c*, 182*d*, 182*e*, 182*f*, 182*g* is moved between an extended position and a retracted position. Cams 184*a*, 184*c*, 184*e*, 184*g* are configured to rotate such that their associated extension members 182*a*, 184*c*, 184*e*, 184*g* extend and retract in unison or near unison. In that way, the first row 204 extends and retracts as a unit. In addition, cams 184*b*, 184*d*, 184*f* are configured to rotate such that their associated extension members 182*b*, 182*d*, 182*f* extend and retract in unison or near unison. In that way, the second row 206 extends and retracts as a unit. Moreover, in the illustrated embodiment, first row 204 and its associated components and the second row 206 and its associated components extend and retract opposite of each other. Accordingly, when the first row 204 is in its extended position, the second row 206 is in its retracted position. Conversely, when the first row 204 is in its retracted position, the second row 206 is in its retracted position. While the illustrated embodiment includes two rows, any number of rows may be used, including but not limited to, one row, three rows, four rows, five rows, six rows, or more than six rows.

Movement of the rows 204, 206 of crop engaging members 180 serves to gather crop that is subjected to the harvesting operation. The crop engaging members 180 engage the crop that is harvested. As the crop engaging members 180 move from an extended position to a retracted position, the crop is gathered in the direction of the implement rear 176. As noted above, the implement may include one or more belts, augers, or other conveyers to move crop towards the feeder house 112. Accordingly, the crop engaging members 180 may move crop into/onto the implement 104, and the crop may then be moved via other means toward the feeder house 112 for further processing. As noted above, the implement also includes a cutter 108 which cuts the crop (best seen in FIG. 2). The cutter 108 may be any type known in the art now or in the future and is, accordingly, not described or shown in detail.

Figure 4:
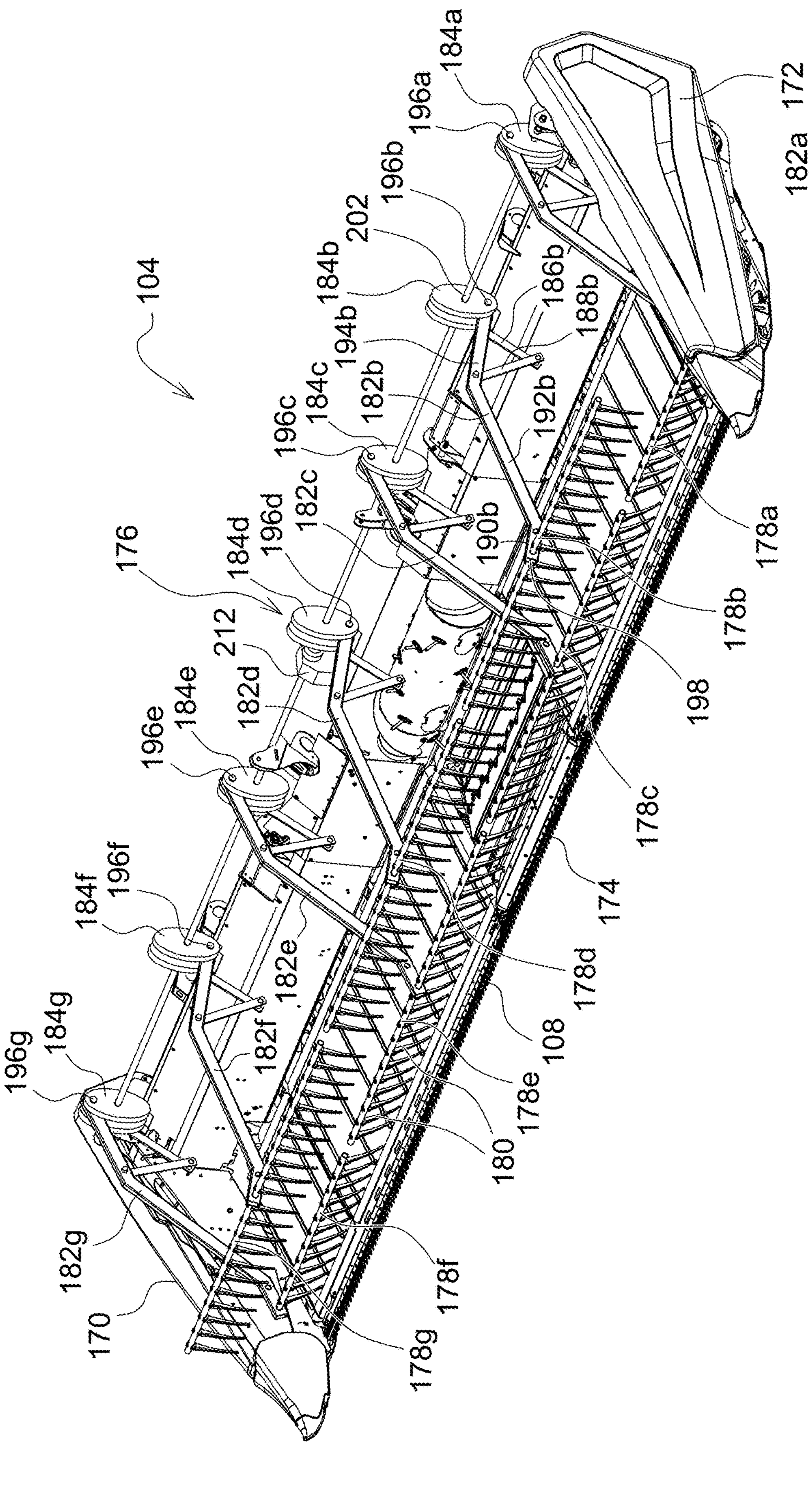
FIG. 4 is a perspective view of a second embodiment of a header of the present invention.
Figure 5:
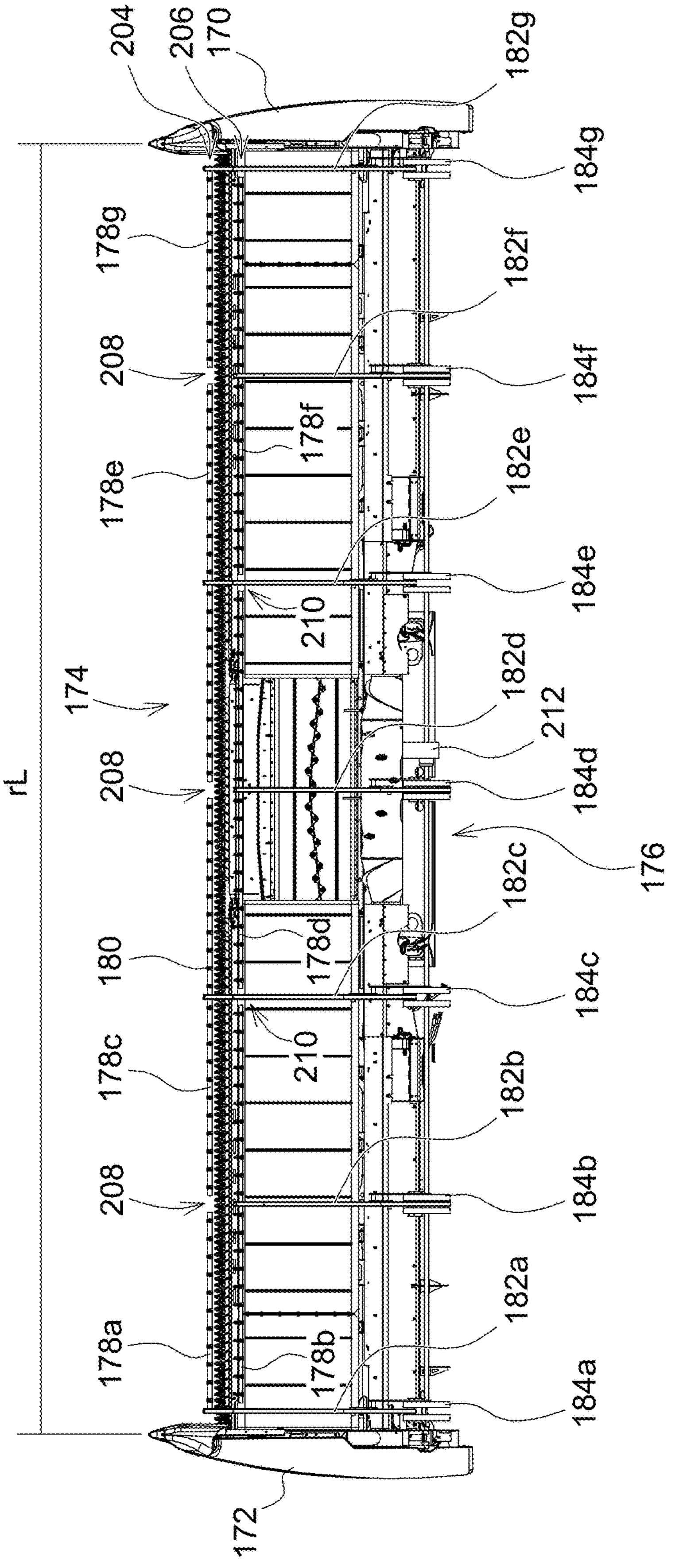
FIG. 5 is a top plan view of the embodiment of a header of the present invention of FIG. 4.

Referring now to FIGS. 4-5, a second implementation of an implement 104 of the present invention is shown. Like reference numerals are used to describe like components. Illustrated are a plurality of cams 184*a*, 184*b*, 184*c*, 184*d*, 184*e*, 184*f*, 184*g* joined to a plurality of extension members 182*a*, 182*b*, 182*c*, 182*d*, 182*e*, 182*f*, 182*g*. The extension members 182*a*, 182*b*, 182*c*, 182*d*, 182*e*, 182*f*, 182*g* are joined to a plurality of crop engaging member supports 178*a*, 178*b*, 178*c*, 178*d*, 178*e*, 178*f*, 178*g*. A plurality of crop engaging members 180 are connected to each crop engaging member support 178*a*, 178*b*, 178*c*, 178*d*, 178*e*, 178*f*, 178*g*. In the implementation of FIGS. 4-5, all cams 184*a*, 184*b*, 184*c*, 184*d*, 184*e*, 184*f*, 184*g* are in operational engagement with a single motor 212. In some embodiments, such a motor is a hydraulic motor. Other types of motors may include, but are not limited to, an electric motor or an internal combustion engine. Each extension member 182*a*, 182*b*, 182*c*, 182*d*, 182*e*, 182*f*, 182*g* is joined to its respective cam 184*a*, 184*b*, 184*c*, 184*d*, 184*e*, 184*f*, 184*g* at a cam engagement location 196*a*, 196*b*, 196*c*, 196*d*, 196*e*, 196*f*, 196*g*. The cam engagement locations 196*a*, 196*b*, 196*c*, 196*d*, 196*e*, 196*f*, 196*g* are coordinated such that the first row 204 of crop engaging members 180 extend and retract together and such that the second row 206 of crop engaging members 180 extend and retract together. In the illustrated embodiment, cams 184*a*, 184*c*, 184*e*, 184*g* are configured such that the crop engaging member supports 178*a*, 178*c*, 178*e*, 178*g* and their associated crop engaging members 180 move as a unit to form the first row 204. Further, cams 184*b*, 184*d*, 184*f* are configured such that their crop engaging member supports 178*b*, 178*d*, 178*f* and their associated crop engaging members 180 move as a unit to form the second row 206. In the illustrated implementation, cam engagement locations 196*a*, 196*c*, 196*e*, 196*g* are positioned opposite cam engagement locations 196*b*, 196*d*, 196*f*. Referring more specifically to the illustrated implementation of FIG. 4, when cam engagement locations 196*a*, 196*c*, 196*e*, 196*g* are located upward, cam engagement locations 196*b*, 196*d*, 196*f* are located downward.

With respect to the source of motion, such as one or more motors, the figures illustrate two of many possible implementations. First, the figures illustrate an implementation wherein each extension member 182 is in operational engagement with its own motor 212. In addition, the figures illustrate an implementation wherein a single motor 212 is used. Other, non-illustrated implementations may be used without departing from the scope of the invention. For example, all extension members 182 associated with crop engaging members 180 forming a row may be associated with a single motor. In another example, each section of the implement 104 may have a single motor, such as a left wing motor, center motor, and/or right wing motor. Any number and arrangement of motors may be used without departing from the scope of the invention.

Figure 6:
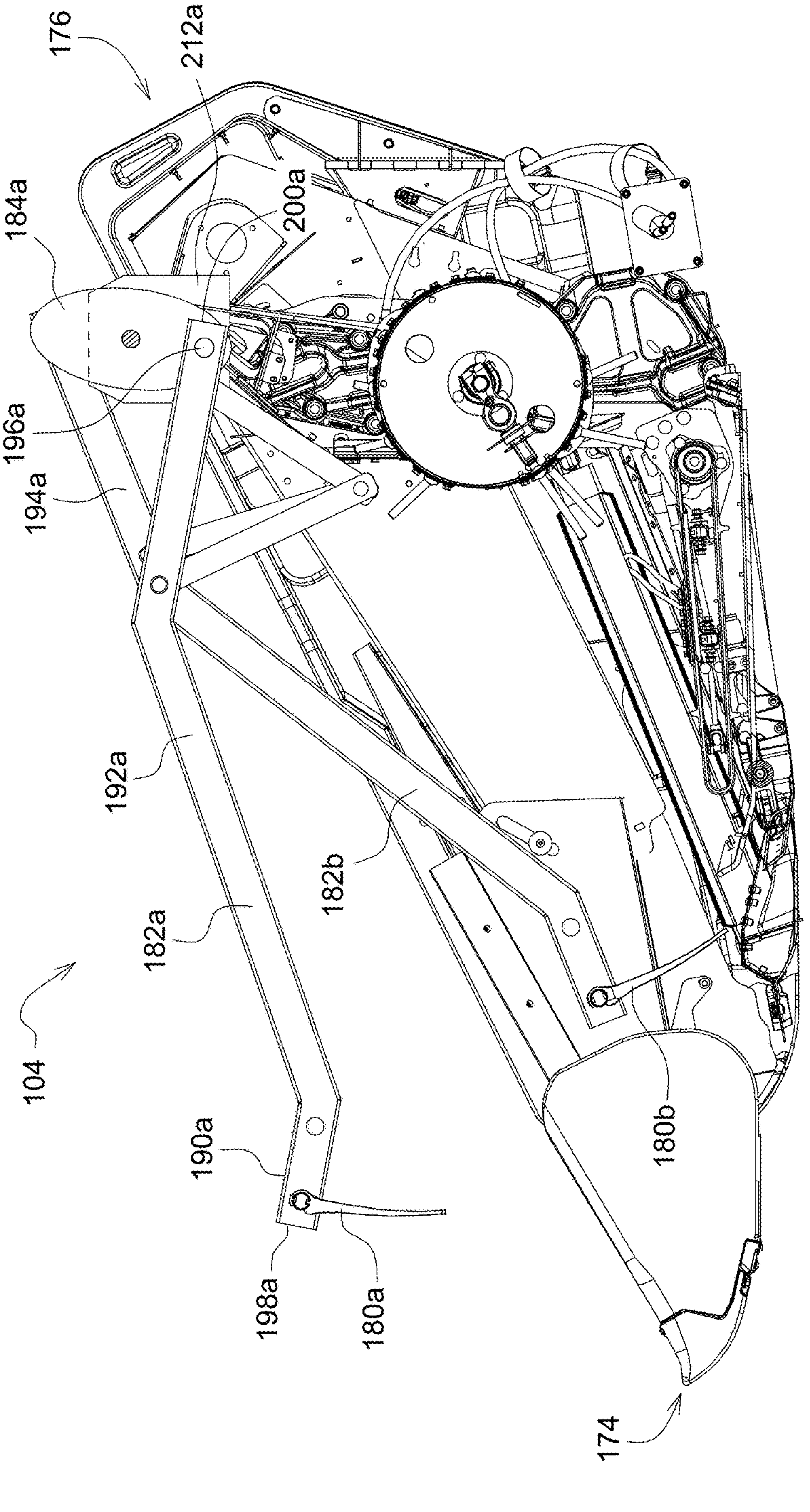
FIG. 6 is a side plan view of the embodiment of FIGS. 2-3 showing the implement in a first position.
Figure 7:
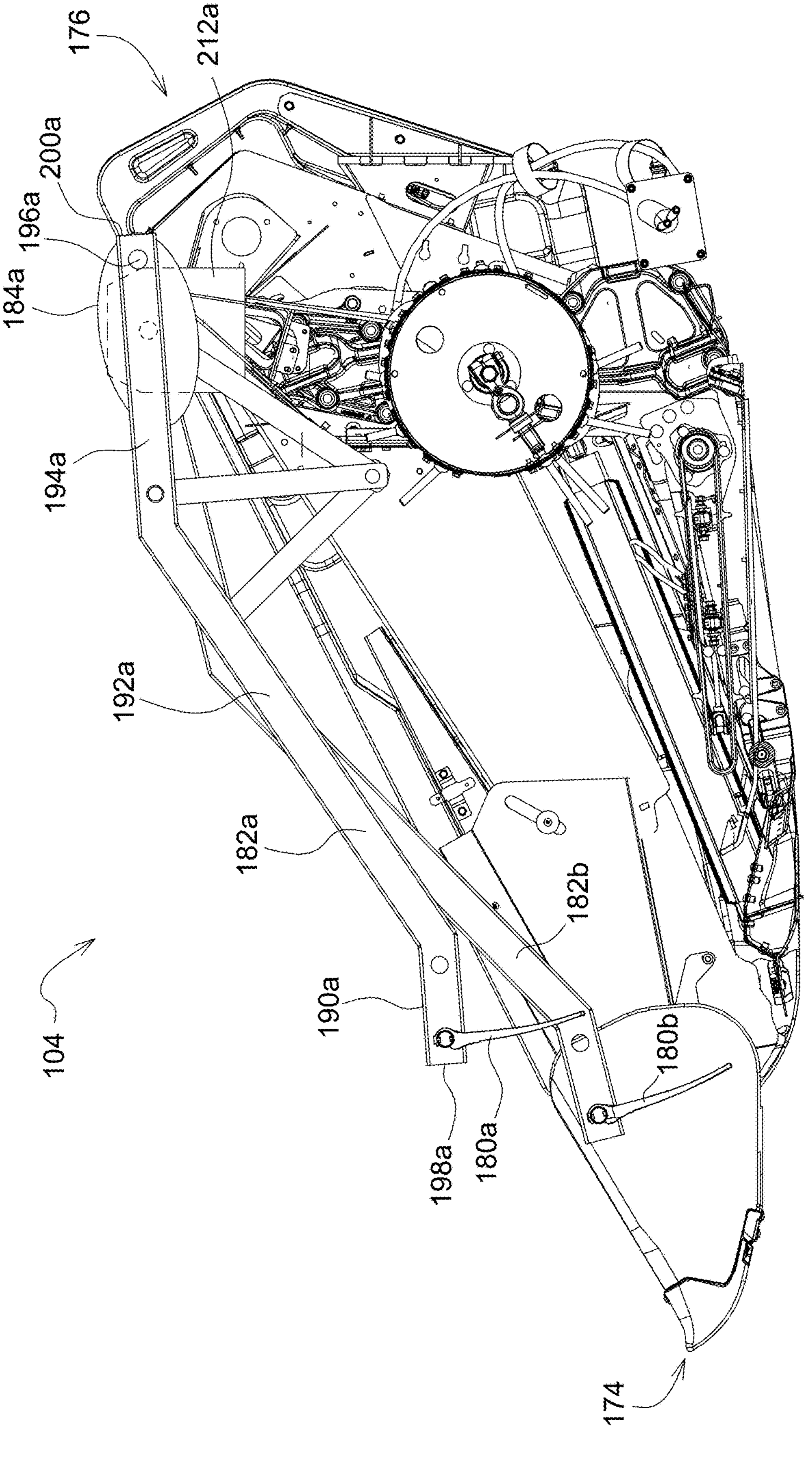
FIG. 7 is a side plan view of the embodiment of FIGS. 2-3 showing the implement in a second position.
Figure 8:
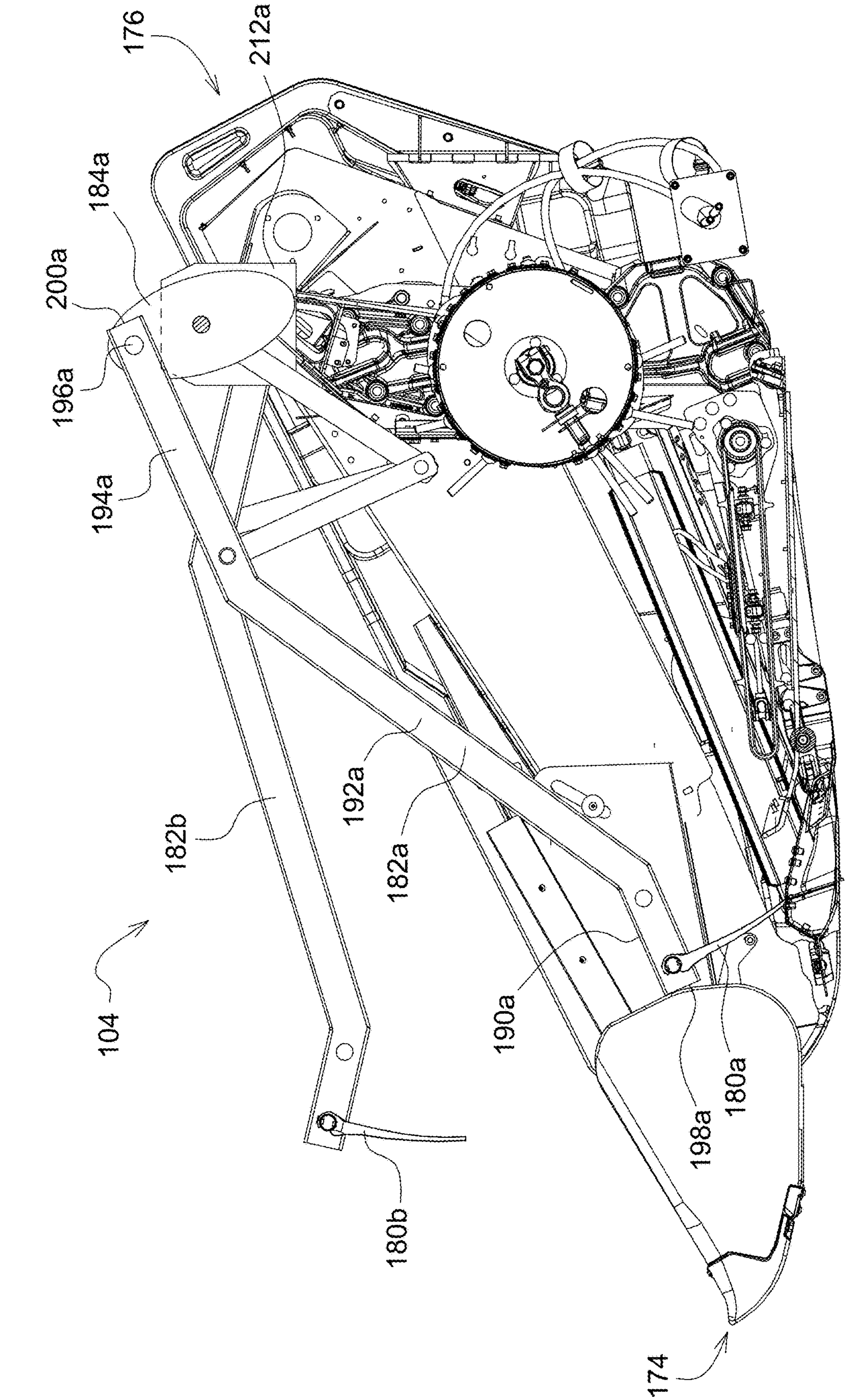
FIG. 8 is a side plan view of the embodiment of FIGS. 2-3 showing the implement in a third position.

Referring to FIGS. 6-8, the implement of FIGS. 2-3 is shown in a plurality of exemplary positions. These exemplary positions are non-limiting and may vary based upon adjustments and/or across embodiments. Namely, each of FIGS. 6-8 show a side view of the implement 104 as cams 184 rotate, which causes the extension members 182 to move between extended and retracted positions. In the side view, extension members 182*a* and 182*b* are shown. However, it is to be understood that all of the first row 204 is represented by 182*a*, as the remainder of the first row is synchronized with 182*a*. Similarly, it is to be understood that all of the second row 206 is represented by 182*b*, as the remainder of the second row is synchronized with 182*b*. Cam 184*a* is oriented such that cam engagement location 196*a* is located near its lowest position relative to the ground. Due to the configuration of extension member 182, including the first 190, second 192, and third 194 portions, this cam engagement location 196*a* configuration results in crop engaging member 180*a* in a more extended position that is located above the ground and towards the front 174 of the implement 104. Cam 184*b* (not shown) is configured in an opposition position. Namely, the cam engagement location 196*b* (not shown) would be located near its highest position relative to the ground. This results in crop engaging member 180*b* having a position that is lower to the ground than crop engaging member 180*a*.

Turning to FIG. 7, cam 186*a* has rotated such that cam engagement location 196*a* is located near the rear 176 of implement 104. This results in a crop engaging member 180*a* location that is lower relative to the ground than the position of FIG. 6. The position of crop engaging member 180*a* is also located closer to implement rear 176 than the position of FIG. 6. Meanwhile cam 186*b* (not shown) has also rotated. Cam engagement location 196*b* (not shown) has likewise moved and is located opposite the position of cam engagement location 196*a*. Namely, cam engagement location 196*b* is located near its forwardmost position toward implement front 174. This results in a position of crop engaging member 180*b* that is located forward towards the front 174 and higher relative to the ground than the position of FIG. 6.

Referring now to FIG. 8, cam 184*a* has rotated such that cam engagement location 196*a* is near its highest location relative to the ground. This results in a crop engaging member 180*a* location that is low to the ground and closer to the rear 176 of the implement. Cam 186*b* (not shown) has also rotated such that cam engagement location 196*b* is located opposite cam engagement location 196*a*. The result is that crop engaging member 180*b* is now in a location that is higher above the ground and closer to implement front 174. Focusing on the motion of crop engaging members 180*a* and 180*b* in FIGS. 6-8, it can be seen that as the cams 184*a*, 184*b* rotate, crop engaging members 180*a*, 180*b* move between extended and retracted positions. Doing so allows the crop engaging members 180*a*, 180*b* to engage crop and move it towards implement rear 176. As the assemblies a and b move between extended and retracted positions, the first 204 and second 206 rows of crop engaging members 180 revolve about each other.

As noted above, the position of the extension members 182 may be adjustable. As such, the position of the extension members 182, crop engaging member supports 178, and crop engaging members 180 with respect to the implement front 174, implement rear 176, and ground 156 may vary from that shown and described in FIGS. 6-8. It will be understood that the implementation shown in FIGS. 6-8 is exemplary only. Based on various adjustments, including but not limited to vertical adjustment of extension members 182, the position of the crop engaging members may vary with respect to cam engagement location 196 and, accordingly, implement front 174, implement rear 174, and ground 156 at various positions of cam 184.

Figure 9:
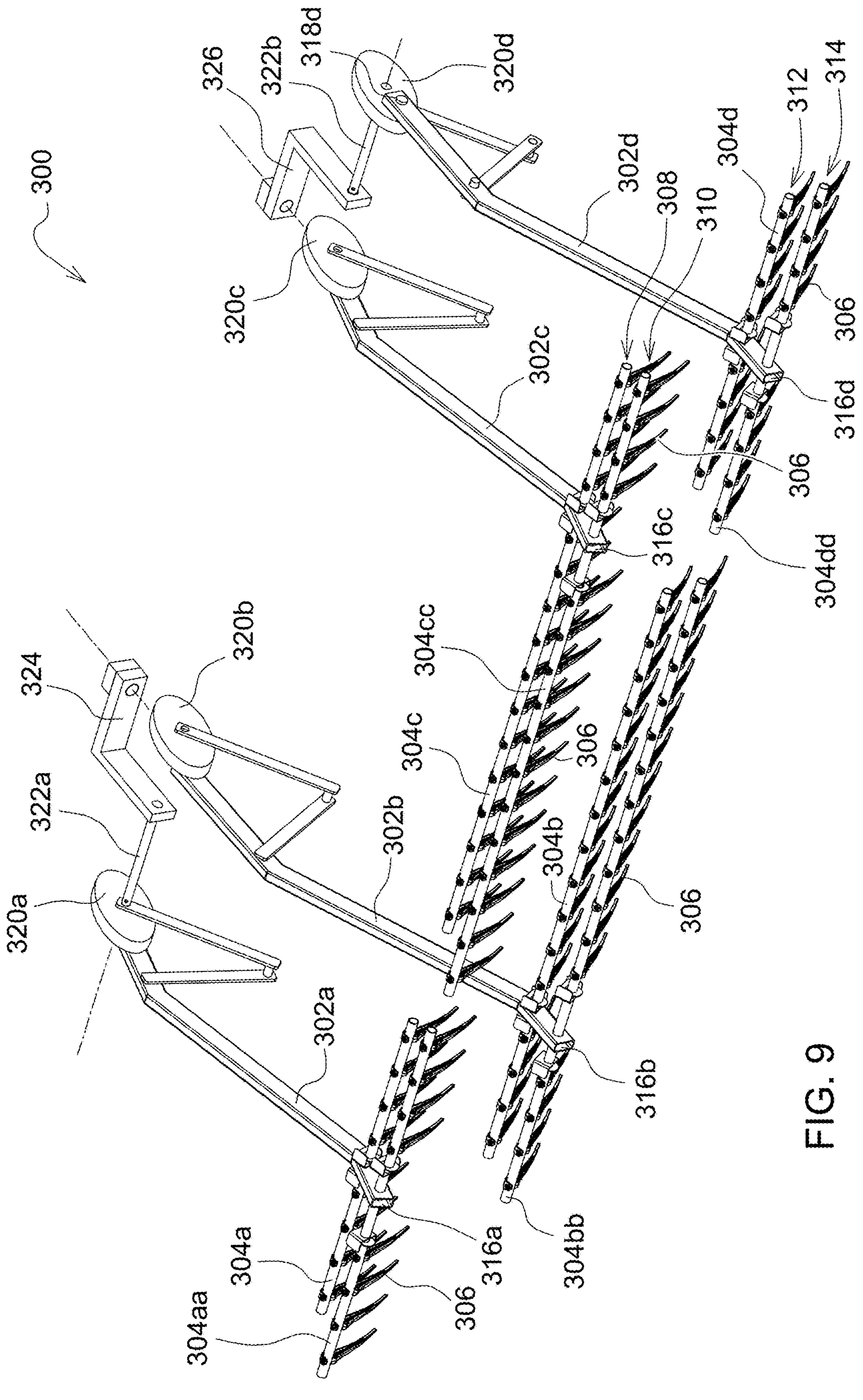
FIG. 9 is a perspective view of an embodiment of a folding implement of the present invention.
Figure 10:
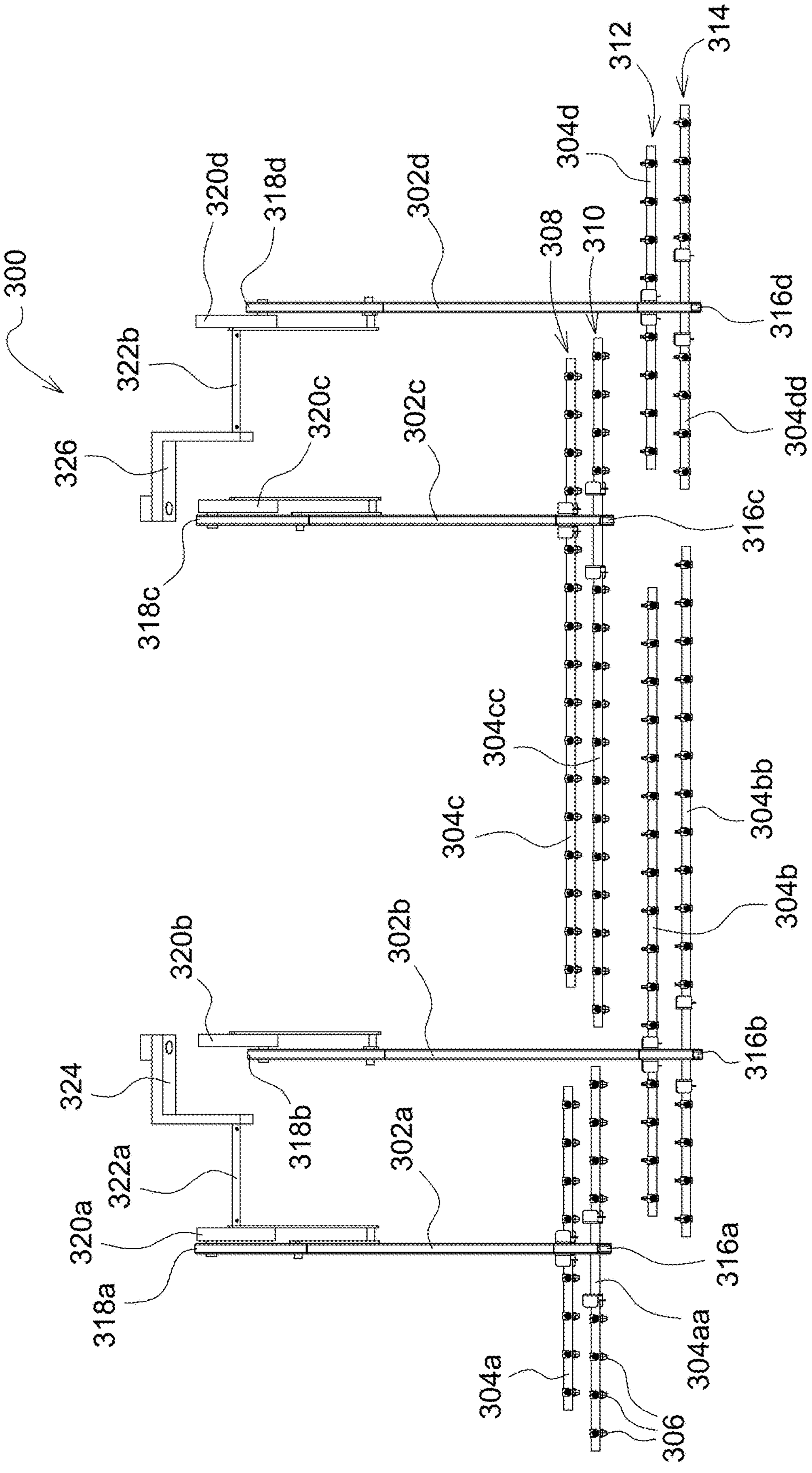
FIG. 10 is a top plan view of the folding implement of FIG. 9.

In some implementations, such an implement may be foldable, such as between harvest and nonharvest positions. A foldable implement may provide advantages during transportation and/or storage. FIGS. 9-12 show an implementation of a foldable implement 300 according to the present invention. Referring to FIGS. 9 and 10, shown are four extension members 302*a*, 302*b*, 302*c*, 302*d*. An implement of the present invention may include any number of extension members. For example, it is anticipated that in some implementations, more than four extension members will be used. Each extension member may be joined to one or more crop engaging member supports. In the illustrated embodiment, each extension member is joined to a plurality of crop engaging member supports, namely two: 304*a*, 304*aa*, 304*b*, 304*bb*, 304*c*, 304*cc*, 304*d*, 304*dd*, respectively. It is anticipated that in some implementations, one or more extension members may be joined to more than two crop engaging member supports. In some implementations, the extension members may be joined to a different number of crop engaging member supports. Furthermore, one or more crop engaging members 306 may extend from each crop engaging member support. In the illustrated implementation, a plurality of crop engaging members extend from each crop engaging member support. Moreover, the illustrated implementation includes four rows of crop engaging members: 308, 310, 312, 314. The first and second rows 308, 310 extend and retract at the same time, while the third and fourth rows 312, 314 extend and retract at the same time. In the illustrated implementation, extension members 302*a* and 302*c* are configured to extend and retract simultaneously with each other, while extension members 302*b* and 302*d* are configured to extend and retract simultaneously with each other. In other implementations, any number of extension members may be configured to extend and retract simultaneously with each other, while in some implementations each extension member may extend and retract in isolation and not simultaneous with one or more other extension members.

Similar to the other illustrated implementations, the extension members 302*a*, 302*b*, 302*c*, 302*d* may include a first end 316 and a second end 318. The extension members 302*a*, 302*b*, 302*c*, 302*d* may be joined to the crop engaging member supports 304*a*, 304*aa*, 304*b*, 304*bb*, 304*c*, 304*cc*, 304*d*, 304*dd* at or near the first end 316. At or near the second end 318, the extension members 302*a*, 302*b*, 302*c*, 302*d* may be joined to a motion transferring member. In the illustrated embodiment, the motion transferring member is a cam 320*a*, 320*b*, 320*c*, 320*d*. As described above, any motion transferring member known in the art may be used. The motion transferring member may be in operational engagement with one or more sources of motion, such as a motor (not shown). One or more of the extension members 302*a*, 302*b*, 302*c*, 302*d* and/or cams 320*a*, 320*b*, 320*c*, 320*d* may be joined to and/or in engagement with one or more linkages 322. In some implementations, the one or more sources of motion (not shown) may be in operational engagement with one or more linkages 322. In some implementations, the linkage(s) 322 may be structural only, and in some implementations, the linkages may serve to also transfer motion from the one or more sources of motion. In some implementations, a single linkage may be used, while in other implementations a plurality of linkages may be used. In the implementation of FIG. 9, extension and retraction of the extension members 302*a*, 302*b*, 302*c*, 302*d* is driven in the same manner as the above-described implementations. Accordingly, the crop engaging member supports 304*a*, 304*aa*, 304*b*, 304*bb*, 304*c*, 304*cc*, 304*d*, 304*dd* and crop engaging members 306 move between extended and retracted positions in the same manner described above, as well as positions therebetween.

In the illustrated implementation of FIG. 9, two linkages 322*a*, 322*b* are shown. Also shown are a first bracket 324 and second bracket 326. In some implementations, the first and second brackets 324, 326 extend either directly or indirectly from the rear of the implement 300. Linkage 322*a* extends between cam 320*a* and first bracket 324. Linkage 322*b* extends between second bracket 326 and cam 320*d*. Further linkages may also be used. It will be understood by one of skill in the art that any number and configuration of linkages may be used without departing from the scope of the invention. First bracket 324 and second bracket 326 may be joined to a rear wall (not shown) of implement 300 by any means known in the art. In some implementations, such joinder may be rotatable such that the position of brackets 324, 326 may rotated as discussed hereinbelow.

Figure 11:
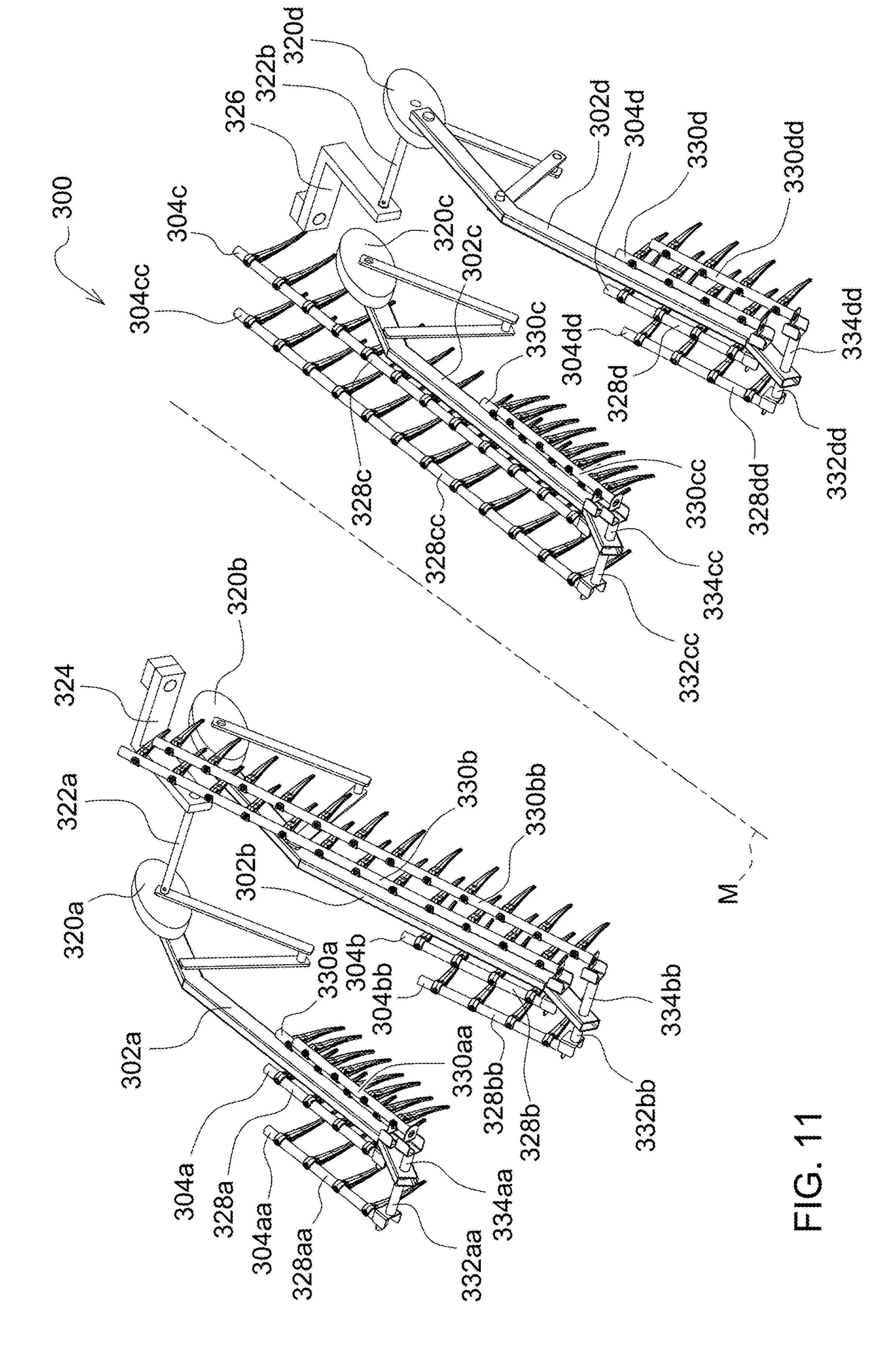
FIG. 11 is a perspective view of the folding implement of FIG. 9 wherein crop engaging member supports are positioned in a non-harvest position.
Figure 12:
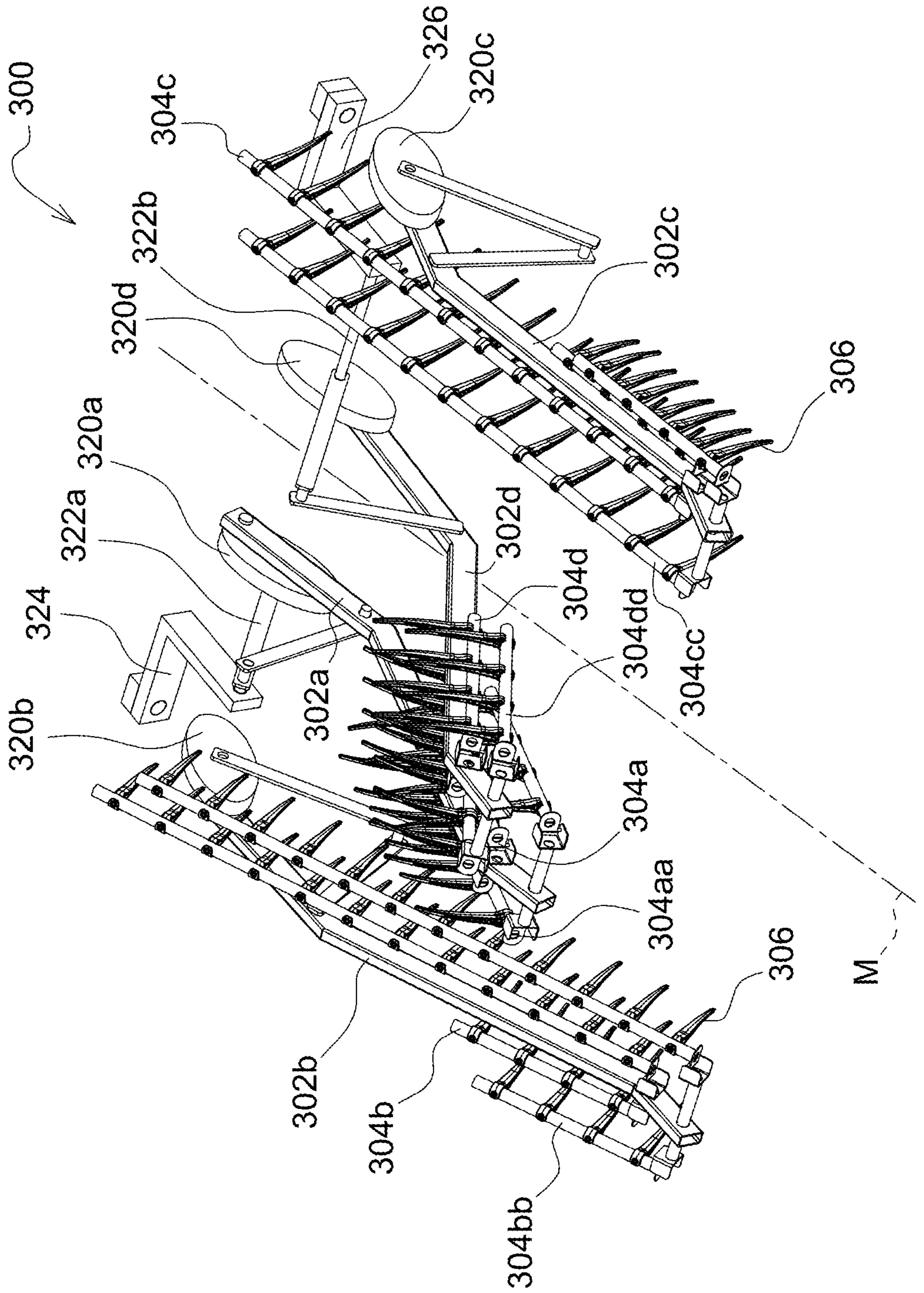
FIG. 12 is a perspective view of the folding implement of FIG. 9 wherein two extension members and crop engaging member supports are position in a non-harvest position.

Referring to FIG. 11, implement 300 may be movable between a harvest position, shown in FIGS. 9-10, and a nonharvest position, shown in FIG. 12. Such movement may be actuated by any manner known in the art. For example, one or more steps of the movement between a harvest and nonharvest position may be actuated by a user in an operator station or a remote user. Further, such actuation may be electronic, mechanical or a combination thereof. In addition, such actuation may be automatic, manual, or a combination thereof. Moreover, FIG. 11 shows a nonharvest position wherein implement is in transition or, said another way, in a partially nonharvest position. In some implementations all of implement 300 may be in a harvest position; in some implementations all of implement 300 may be in a nonharvest position; and in some implementations a portion of implement 300 may be in a harvest position while a portion of implement 300 may be in a nonharvest position. When implement 300 or portions thereof are in the harvest position, the implement or such portions are configured to harvest crop. When implement 300 or portions thereof are in the nonharvest position, the implement or such portion are not configured to actively harvest crop. The nonharvest position may be desirable for transportation and/or storage. In the illustrated implementation, the overall length of implement 300 is decreased when the implement 300 (or portions thereof) are in the nonharvest position as compared to the harvest position.

With continued reference to FIG. 11, at least a portion of one or more crop engaging member supports 304 may be movable with respect to the extension member 302 to which it is joined. In the illustrated embodiment, each crop engaging member support 304 includes one or more foldable sections. Moreover, some of the illustrated crop engaging member supports 304 include a nonfoldable section. Referring first to extension member 302*a* and the crop engaging member supports 304*a*, 304*aa* joined to extension member 302*a*, crop engaging member support 304*a* includes a first folding section 328*a* and a second folding section 330*a*. Crop engaging member support 304*aa* includes a first folding section 328*aa*, a first nonfolding section 332*aa*, a second nonfolding section 334*aa*, and a second folding section 330*aa*. As shown in FIG. 11, the nonfolding sections 332*aa*, 334*aa* are configured to allow folding of the crop engaging member support 304*a* between the folding sections of crop engaging member support 304*aa* and extension member 302*a*. In the illustrated embodiment, crop engaging member supports 304*b*, 304*bb*, 304*c*, 304*cc*, 304*d*, and 304*dd* are similarly arranged and, therefore, not described in detail. The illustrated and described implementation of movement of the crop support members back towards the combine is merely one example of one or more implementations of a foldable implement of the present invention. In other implementations, crop support members may fold forward in the direction of transport, to the side, downward, upward, or in any other direction. Moreover, a combination of directions may be used. In some implementations, an objective may be to move the implement into a position that is more desirable for transport and/or storage, such as transport on a road.

Referring to FIG. 12, first bracket 324 and second bracket 326 may be movable between harvest and nonharvest positions. In the harvest position, first bracket 324 and second bracket 326 are configured such that extension members 302*a* and 302*d*, respectively, are positioned closer to the ends of the implement 300 than extension members 302*b* and 302*c*, respectively. The brackets 324, 326 may be movable such that extension members 302*a*, 302*d*, and the crop engaging member supports 304 associated therewith (304*a*, 304*aa*, 302*d*, 302*dd*) are moved up and between extension members 302*b* and 302*c*, which in the illustrated embodiment is towards the middle M of implement. In this position, extension members 302*a*, 302*d* are located between extension members 302*b*, 302*c*, as shown in FIG. 12. In the illustrated embodiment, the brackets 324, 326 are rotatable to carry out this movement. In some implementations, brackets 324, 326 may be joined to the rear of the implement by any manner known in the art that allows for such rotation. Examples include, but are not limited to, mounting via fasteners, physical joinder via welding, or a casted feature. This movement decreases the overall length of implement 300. As discussed above, decreasing the length of the implement can be advantageous for transport and storage of the implement.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. An implement for a harvesting machine, comprising:

a first group of crop engaging members extending from a first crop engaging member support, said first crop engaging member support extending from a first extension member;

at least a portion of said first crop engaging member support movable with respect to said first extension member between a harvest position and a nonharvest position;

a second group of crop engaging members extending from a second crop engaging member support, said second crop engaging member support extending from a second extension member;

at least a portion of said second crop engaging member support movable with respect to said second extension member between a harvest position and a nonharvest position;

a first plurality of crop engaging member supports extending from said first extension member, wherein at least a portion of each of the first plurality of crop engaging member supports are movable with respect to said first extension member between a harvest position and a nonharvest position; and a second plurality of crop engaging member supports extending from said second extension member, wherein at least a portion of each of the second plurality of crop engaging member supports are movable with respect to said second extension member between a harvest position and a nonharvest position.

2. An implement for a harvesting machine, comprising:

a first plurality of crop engaging member supports including a first crop engaging member support extending from a first extension member, wherein at least a portion of each of the first plurality of crop engaging member supports extending from said first extension member are movable with respect to said first extension member between a harvest position and a nonharvest position;

a first group of crop engaging members extending from said first crop engaging member support;

at least a portion of said first crop engaging member support movable with respect to said first extension member between a harvest position and a nonharvest position;

a second group of crop engaging members extending from a second crop engaging member support, said second crop engaging member support extending from a second extension member; and at least a portion of said second crop engaging member support movable with respect to said second extension member between a harvest position and a nonharvest position;

a third group of crop engaging members extending from a third crop engaging member support, said third crop engaging member support extending from a third extension member;

at least a portion of said third crop engaging member support movable with respect to said third extension member between a harvest position and a nonharvest position;

a fourth group of crop engaging members extending from a fourth crop engaging member support, said fourth crop engaging member support extending from a fourth extension member; and at least a portion of said fourth crop engaging member support movable with respect to said fourth extension member between a harvest position and a nonharvest position.

3. The implement of claim 2, comprising a second plurality of crop engaging member supports extending from said second extension member, wherein at least a portion of each of the second plurality of crop engaging member supports are movable with respect to said second extension member between a harvest position and a nonharvest position.

4. The implement of claim 2, wherein at least a portion of said first and second crop engaging member supports are pivotable.

5. The implement of claim 2, wherein one or more of the first, second, third, and fourth extension members are movable between harvest and non-harvest positions.

6. The implement of claim 2, further comprising:

at least one source of motion configured to drive said first and second extension members between extended and retracted positions;

a first motion transferring member joined to said first extension member; and a second motion transferring member joined to said second extension member.

7. The implement of claim 2, wherein said first extension member is configured to move at least a portion of said first group of crop engaging members between a first group extended position and a first group retracted position and wherein said second extension member is configured to move at least a portion of said second group of crop engaging members between a second group extended position and a second group retracted position.

8. The implement of claim 7, wherein said first and second groups of crop engaging members revolve about each other as said first and second groups of crop engaging members move between said extended and retracted positions.

9. The implement of claim 8, further comprising at least one source of motion driving movement between said first and second group extended and retracted positions.

10. An implement for a harvesting machine, comprising:

a first group of crop engaging members extending from a first crop engaging member support, said first crop engaging member support connected to a first extension member;

a second group of crop engaging members extending from a second crop engaging member support, said second crop engaging member support connected to a second extension member;

said second extension member movable between harvest and nonharvest positions;

a first bracket that is rotatable between harvest and nonharvest positions;

wherein rotation of said first bracket between harvest and nonharvest positions moves said second extension member between harvest and nonharvest positions;

a plurality of crop engaging member supports extending from said first extension member;

a plurality of crop engaging member supports extending from said second extension member; and a plurality of crop engaging members extend from each crop engaging member support.

11. The implement of claim 10, wherein at least a portion of each crop engaging member support is movable between a harvest and nonharvest position.

* * * * *